C. COLE
Device for Converting Motion.

No. 205,055.      Patented June 18, 1878.

Witnesses
John Grist
F. J. Ross

Inventor
Charles Cole
By Henry Grist
Attorney

UNITED STATES PATENT OFFICE.

CHARLES COLE, OF OTTAWA, ONTARIO, CANADA.

IMPROVEMENT IN DEVICES FOR CONVERTING MOTION.

Specification forming part of Letters Patent No. 205,055, dated June 18, 1878; application filed June 3, 1878.

*To all whom it may concern:*

Be it known that I, CHARLES COLE, of the city of Ottawa, in the county of Carleton, in the Province of Ontario, in the Dominion of Canada, have invented certain new and useful Improvements in Devices for Converting Reciprocating into Rotary Motion; and I do hereby declare that the following is a full, clear, and exact description of the same.

This invention relates to a device whereby the change of motion is effected by the reciprocating motion of a link or yoke attached by a toggle-bar to the end of a piston-rod or pitman, operating a peripheral grooved wheel on a shaft to transmit rotary motion, said wheel being operated by alternate engagement of the upper and lower inner edges of the link with the periphery of the wheel as the link is moved backward by the stroke of the piston-rod, the change of alternate frictional engagement being effected by the tilting motion of the yoke at the end of each stroke, said tilting motion being caused by the oblique connection of the toggle-bar with the rod and link.

Figure 1:
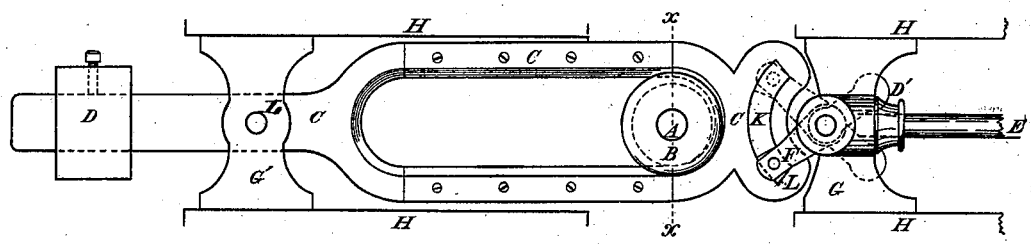
Figure 2:
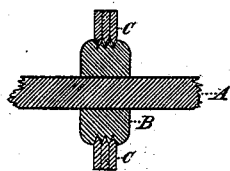

Figure 1 is a side view of my improved device. Fig. 2 is a section on the line *x x*.

H are guides in which run the cross-heads G G', the latter carrying the piston-rod E and the former the outer end of a link or yoke, C, its other end connected to the rod E by a toggle-bar, F, which has an adjustable position in an arc-shaped slot, K, at the end of the yoke C, by means of thrust-blocks L sliding in said slot, and to which block one end of bar F is pivotally bolted. The other end terminates in a counterbalance-weight, D', and centrally the bar is connected by a wrist-pin to the end of the pistol E.

B is a friction-wheel, having a V-grooved periphery operating within the link C, which has corresponding V projections to increase the frictional contact. The wheel B is smaller than the transverse diameter of the open link in the yoke, and is keyed on a shaft, A, which has fixed bearings, and to which shaft the reciprocating motion of the yoke communicates a rotary motion by its backward and forward movement when the toggle-bar F is adjusted above or below the center; but when adjusted in line therewith the yoke will operate without rotating the wheel B and shaft A. When the toggle-bar F is adjusted above the center a motion will be given to the wheel B the reverse of that which will be given by its adjustment obliquely below the center. The greater the obliquity given to the toggle-bar the greater will be the frictional contact of the wheel and yoke.

D is a weight adjustable on a projecting horn of the yoke C, and through which horn passes the pivot-pin L into the cross-head G', whereby the yoke can be counterbalanced according to the degree of friction required.

The outward stroke of the piston-rod, when the toggle-bar is connected to the yoke below the shaft A, causes depression of the inner end of the yoke, and thus brings the upper edge of the yoke in contact with the wheel B, rotating it, and at the inward stroke of the piston-rod the toggle-bar will lift the lower edge of the yoke into contact with the wheel and rotate it in the same direction as that imparted by the outward stroke of the piston-rod, and which direction may be reversed by changing the connection of the toggle-bar so as to be above the shaft A, as previously described.

If desired, the connection of the toggle-bars with the yoke may be below the wheel B where large wheels are required to be used on the driving-shaft A instead of the end of the yoke, as shown in the drawings, and the arc-shaped slot K may be dispensed with, and other means employed to connect the toggle-bar with the yoke.

I claim as my invention—

1. The combination of the yoke C, friction-wheel B on shaft A, and toggle-bar F with the piston-rod E, as set forth, and operating as described.

2. The yoke C, counterbalanced by weight D, and the toggle-bar F, counterbalanced by weight D', in combination with the friction-wheel B, as set forth.

CHARLES COLE.

Witnesses:
  HENRY GRIST,
  F. J. ROSS.